May 8, 1923.
T. H. WRIGHT
1,454,807
SWIVEL TRUCK FOR MONORAILS
Filed Sept. 15, 1922
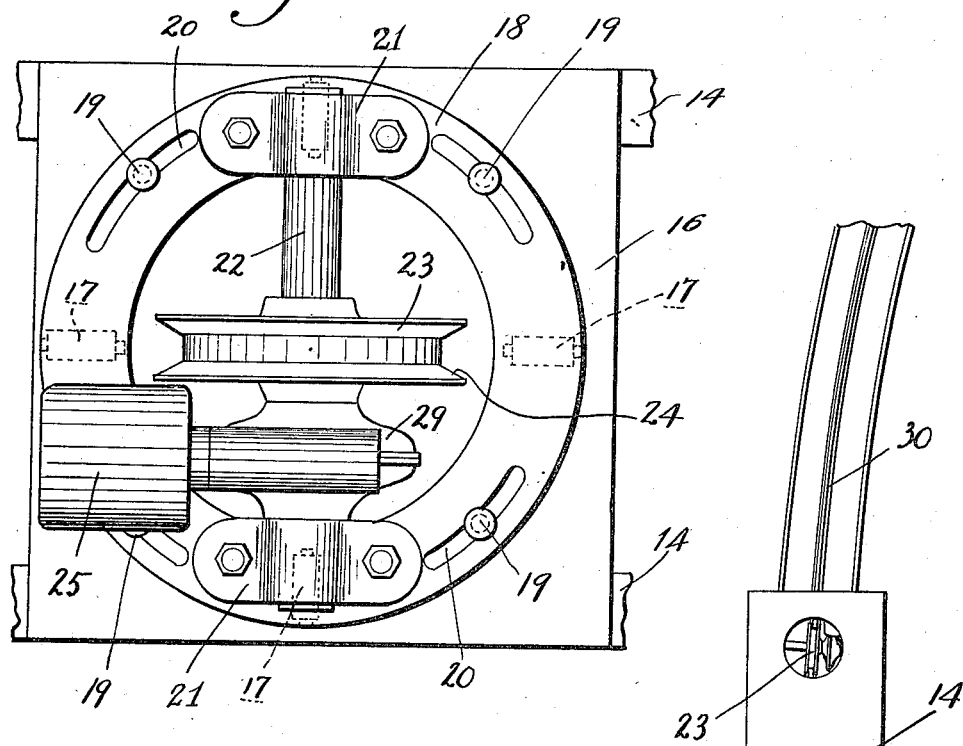
Fig. 2.
Fig. 1.
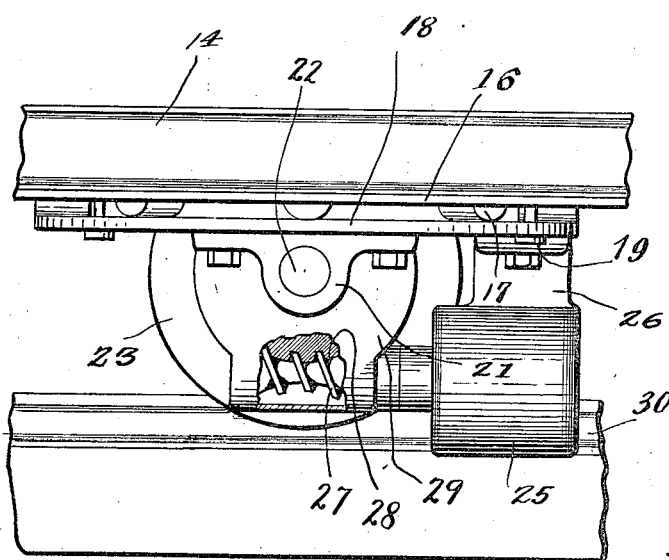
Fig. 3.
Inventor,
Thomas H. Wright
by Hazard and Miller
ATTORNEYS Patented May 8, 1923.

UNITED STATES PATENT OFFICE.

THOMAS H. WRIGHT, OF LOS ANGELES, CALIFORNIA.

SWIVEL TRUCK FOR MONORAILS.

Application filed September 15, 1922. Serial No. 588,434.

*To all whom it may concern:*

Be it known that I, THOMAS H. WRIGHT, a citizen of the United States, residing at Los Angeles, in the county of Los Angeles and State of California, have invented new and useful Improvements in Swivel Trucks for Monorails, of which the following is a specification.

My invention relates to rolling stock for mono-rails, and a purpose of my invention is the provision of a mono-rail locomotive, car or truck having means by which the supporting and driving mechanism is mounted to swivel with respect to the car chassis so as to permit a mono-rail car to traverse the curved portions of the mono-rail track.

Although I have herein shown and described only one form of swivel truck embodying my invention, the novel features of which will be pointed out in claims, it is to be understood that various changes and modifications may be made without departing from the spirit of the invention and the spirit and scope of the appended claims.

In the accompanying drawings,

Figure 1 is a view showing in top plan one form of swiveled mono-rail truck or car embodying my invention in applied position upon a mono-rail;

Figure 2 is a bottom plan view of one of the supporting and driving means embodied in the truck shown in Figure 1.

Figure 3 is a fragmentary view showing in side elevation the supporting and driving means shown in Figure 2.

Referring specifically to the drawings, in which similar reference characters refer to similar parts, my invention, in its present embodiment, comprises a truck chassis designated generally at 14 having arranged on its under side two or more supporting and driving mechanisms. In the present instance, I have shown two such mechanisms arranged adjacent the opposite ends of the truck chassis, but it is to be understood that any number and arrangement of these mechanisms may be provided without departing from the spirit of the invention.

As shown in Figures 2 and 3, each supporting and driving mechanism comprises a flat, metallic member 16 suitably secured to the under side of the chassis 14 and carrying a plurality of rollers 17 arranged with their axes disposed diametrically to the member. A movable flat, annular member 18 underlies the member 16 and is connected by means of pins, bolts or the like designated at 19. These members 19 are circumferentially spaced about the member 16 and extend through slots 20 formed in the member 18 so as to support the member 18 for limited rotational movement on the member 16. The rollers 17 are arranged to be interposed between the members 16 and 18 so as to effect an unrestricted movement of the member 18 with respect to the member 16 or vice versa. The member 18 carries bearings 21 in which are journaled the opposite ends of a shaft 22, and fixed to this shaft between its ends and within the area defined by the members 16 and 18 is a supporting and driving wheel 23 provided with flanges 24 which are adapted to engage the sides of a mono-rail for preventing lateral displacement of the wheel from the rail. If the wheel 23 is made of the diameter shown, it is, of course, necessary to provide a suitable opening in the plate 16 to allow of the unrestricted rotation and lateral movement of the wheel. The shaft 22 is adapted to be driven by an electric motor 25 sustained in a bracket 26 secured to the underside of the member 18. The shaft of the motor 25 is operatively connected to a worm 27 which constantly meshes with a worm wheel 28 fixed to the shaft 22 and arranged within a casing 29.

In operation, the supporting and driving mechanisms allow the wheels 23 when traversing a mono-rail designated at 30 to occupy any position in conforming to the curvature of the rail without disturbing the relative position of the truck chassis 14 with respect to the rail. In practice, the members 18 being movably associated with the members 16 allow of the wheels 23, together with their driving means, bodily turning about the axis of the members as centers so that when the truck is traversing the curved portion of a mono-rail the wheels are free to turn to maintain their engagement with the rail and thereby prevent jumping of the truck from the rail. The rollers 17 allow of the unrestricted relative movement of the members 16 and 18, while the limiting pins 19 cooperate with the slots 20 in limiting the rotational movement of these members, as will be understood.

I claim as my invention:

1. In combination, a mono-rail car including a chassis, a member secured to the chassis, rollers sustained on the member, one annular member underlying the first member for rotational movement and adapted to be engaged by said rollers, a wheel carried by the second member for engagement with the mono-rail, and driving means carried by the second member for driving said wheel.

2. In combination, a member adapted to be fixed to a monorail car, a movable member having pin slot connections with the first member to allow rotational movement of the movable member, and members interposed between the members and mounted for rotational movement about axes disposed radially of the members.

3. In combination, a member adapted to be secured to the under side of a monorail car, a second member suspended from the first member and associated therewith to allow of a limited rational movement thereof, rollers interposed between the members, and a wheel carried by the second member and adapted for engagement with the monorail.

4. In combination, a member adapted to be secured to the under side of a mono-rail car, a second member underlying the first member and connected therewith to allow of rotational movement thereof, a wheel carried by the second member and adapted for engagement with the mono-rail, and a motor carried by the second member for driving said wheel.

5. In combination, a member adapted to be fixed to a mono-rail car, a movable member having pin-and-slot connections with the first member to allow rotational movement of the movable member, rollers interposed between the members and mounted for rotational movement about axes disposed radially of the members, a shaft carried by the movable member, a wheel fixed to said shaft, and a motor sustained on the movable member and operatively connected to said shaft for driving said wheel.

6. In combination, a member adapted to be fixed to a mono-rail car, a movable member having a pin-and-slot connection with the first member to allow rotational movement of the movable member and a wheel mounted on the movable member.

In testimony whereof I have signed my name to this specification.

THOMAS H. WRIGHT.